(12) United States Patent
Fujimura et al.

(10) Patent No.: US 8,642,146 B2
(45) Date of Patent: Feb. 4, 2014

(54) COATING LIQUID AND GAS BARRIER LAMINATE

(76) Inventors: Chisato Fujimura, Tokyo (JP);
Masayuki Kashimura, Tokyo (JP);
Katsumi Kawaguchi, Tokyo (JP)

( * ) Notice: Subject to any disclaimer, the term of this patent is extended or adjusted under 35 U.S.C. 154(b) by 188 days.

(21) Appl. No.: 13/128,913

(22) PCT Filed: Oct. 23, 2009

(86) PCT No.: PCT/JP2009/068268
§ 371 (c)(1),
(2), (4) Date: May 12, 2011

(87) PCT Pub. No.: WO2010/061705
PCT Pub. Date: Jun. 3, 2010

(65) Prior Publication Data
US 2011/0217561 A1    Sep. 8, 2011

(30) Foreign Application Priority Data
Nov. 25, 2008    (JP) .................................. 2008-299464

(51) Int. Cl.
*B32B 27/06*    (2006.01)
*B32B 27/08*    (2006.01)
*B32B 27/18*    (2006.01)
*B32B 27/20*    (2006.01)
*B32B 27/30*    (2006.01)
*B32B 27/36*    (2006.01)

(52) U.S. Cl.
USPC .......... 428/36.6; 428/212; 428/213; 428/219; 428/323; 428/480

(58) Field of Classification Search
None
See application file for complete search history.

(56) References Cited

U.S. PATENT DOCUMENTS

| | | | |
|---|---|---|---|
| 3,646,099 A | 2/1972 | Dannals | |
| 4,116,904 A * | 9/1978 | Verma | 106/254 |
| 4,391,381 A * | 7/1983 | Ota et al. | 428/35.7 |
| 4,517,098 A * | 5/1985 | Hann et al. | 210/701 |
| 4,783,497 A * | 11/1988 | Thompson | 524/391 |
| 5,068,056 A * | 11/1991 | Robb | 516/90 |
| 5,116,418 A * | 5/1992 | Kaliski | 106/419 |
| 5,372,879 A * | 12/1994 | Handa et al. | 428/327 |
| 5,449,402 A * | 9/1995 | Whalen-Shaw | 106/416 |
| 5,910,356 A * | 6/1999 | Ishikawa et al. | 428/215 |
| 5,942,320 A * | 8/1999 | Miyake et al. | 428/216 |
| 6,184,281 B1 * | 2/2001 | Craun et al. | 524/413 |
| 6,200,680 B1 * | 3/2001 | Takeda et al. | 428/402 |
| 6,652,967 B2 * | 11/2003 | Yadav et al. | 428/403 |
| 6,926,945 B2 | 8/2005 | Yano et al. | |
| 6,942,897 B2 * | 9/2005 | Joyce et al. | 427/365 |
| 7,022,759 B2 * | 4/2006 | Martin et al. | 524/513 |
| 7,030,197 B2 * | 4/2006 | Morimoto et al. | 525/429 |
| 7,141,625 B2 * | 11/2006 | Komazaki et al. | 524/539 |
| 7,399,518 B2 * | 7/2008 | Ito et al. | 428/195.1 |
| 7,476,712 B2 * | 1/2009 | Tanaka et al. | 525/330.2 |
| 7,569,267 B2 * | 8/2009 | Tanaka et al. | 428/220 |
| 7,807,272 B2 * | 10/2010 | Okura et al. | 428/522 |
| 7,910,213 B2 * | 3/2011 | Yoshida et al. | 428/423.1 |
| 8,114,521 B2 * | 2/2012 | Kuwata et al. | 428/425.9 |
| 8,247,027 B2 * | 8/2012 | Mukkamala et al. | 427/195 |
| 8,309,217 B2 * | 11/2012 | Okuzu et al. | 428/336 |
| 2004/0156986 A1 * | 8/2004 | Yadav | 427/180 |
| 2007/0059518 A1 * | 3/2007 | Tanaka et al. | 428/328 |
| 2009/0047529 A1 * | 2/2009 | Kawashima et al. | 428/458 |

FOREIGN PATENT DOCUMENTS

| | | | |
|---|---|---|---|
| JP | 2003-012841 | * | 1/2003 |
| JP | 2003012841 A | | 1/2003 |
| JP | 2004-018649 | * | 1/2004 |
| JP | 2004018649 A | | 1/2004 |
| JP | 2005047964 A | | 2/2005 |
| JP | 2008178988 A | | 8/2008 |
| WO | 03091317 A1 | | 11/2003 |
| WO | 2005037534 A2 | | 4/2005 |
| WO | 2007125741 A1 | | 11/2007 |
| WO | WO 2009/114072 | * | 9/2009 |

OTHER PUBLICATIONS

"Atarashii Bunsan-Nyuka no Kagaku to Oyo Gijutsu no Shin Tenkai", 1st Ed., Kabushiki Kaisha Tekuno Shisutemu, Jun. 20, 2006, ed. by Kunio Furusawa, pp. 349-350, partial English translation attached.

* cited by examiner

*Primary Examiner* — Vivian Chen
(74) *Attorney, Agent, or Firm* — The Webb Law Firm

(57) ABSTRACT

Provided are aqueous coating liquids that contain ultrafine inorganic compound particles with good dispersibility, and gas barrier laminates of excellent transparency and gas barrier properties that have a layer formed from the coating liquid. The coating liquid includes ultrafine inorganic compound particles, a polyester resin, a sodium polycarboxylate and water. The gas barrier laminate includes a substrate and a gas barrier layer formed on the substrate, wherein the gas barrier layer has a layer (A) formed from the coating liquid and a layer (B) containing a polycarboxylic acid polymer.

5 Claims, No Drawings

COATING LIQUID AND GAS BARRIER LAMINATE

TECHNICAL FIELD

The present invention relates to coating liquids and gas barrier laminates.

BACKGROUND ART

Coating liquids that contain ultrafine particles of inorganic compounds, for example zinc oxide, in water are known. However, ultrafine particles of zinc oxide (hereinafter, also ultrafine zinc oxide particles) generally have poor dispersibility in water. Consequently, the application of such coating liquids results in layers that have uneven concentrations of ultrafine zinc oxide particles.

There have been disclosed gas barrier films that are formed by applying a coating liquid containing a polyvalent metal compound such as zinc oxide on a layer containing polyacrylic acid (see for example Patent Literatures 1 and 2).

Patent Literature 1 describes that when water is used as a solvent for the coating liquid containing a polyvalent metal compound, the application of the coating liquid to a polycarboxylic acid polymer layer results in a reaction between the polycarboxylic acid polymer and the polyvalent metal compound possibly to form an inhomogeneous precipitate. The literature then describes that nonaqueous solvents or mixtures of nonaqueous solvents and water are preferable as the solvents for the coating liquids. However, the nonuse of organic solvents has been desired recently from the environmentally friendly point of view. That is, coating liquids containing water as the solvent are desirable.

Patent Literature 2 describes that the coating liquid containing a polyvalent metal compound is applied to a polycarboxylic acid polymer layer that has improved water resistance, and therefore the coating liquid can use water as a solvent.

However, Patent Literatures 1 and 2 do not fully consider components other than the polyvalent metal compounds that may be contained in the coating liquids or do not study sufficiently the dispersibility of the polyvalent metal compounds.

CITATION LIST

Patent Literatures

Patent Literature 1: WO 03/091317
Patent Literature 2: WO 07/125741

SUMMARY OF INVENTION

Technical Problem

The present invention has been made in view of the problems in the art as described above. It is therefore an object of the invention to provide aqueous coating liquids that can be used in the production of gas barrier laminates and contain ultrafine inorganic compound particles with good dispersibility, and to provide gas barrier laminates of excellent transparency and gas barrier properties that have a layer formed from the coating liquid.

Solution to Problem

The present inventors studied diligently to achieve the object described hereinabove. They have then found that sodium polycarboxylates as dispersants deliver good dispersibility of ultrafine inorganic compound particles in a coating liquid, and that gas barrier laminates which have a layer from such coating liquid and a layer containing polyacrylic acid achieve excellent transparency and gas barrier properties. The present invention has been completed based on the findings.

A coating liquid according to the present invention comprises ultrafine inorganic compound particles, a polyester resin, a sodium polycarboxylate and water.

The coating liquid is preferably obtained by mixing water, ultrafine inorganic compound particles, an aqueous polyester resin dispersion and a sodium polycarboxylate.

Preferably, the coating liquid further comprises a water-dispersible isocyanate compound.

The ultrafine inorganic compound particles are preferably ultrafine particles of zinc oxide.

The coating liquid preferably contains the ultrafine inorganic compound particles at 65 to 90 wt % based on 100 wt % of the solid components in the coating liquid.

The polyester resin preferably has an acid value of not more than 15 mg KOH/g.

The polyester resin preferably has a glass transition temperature (Tg) of not less than −30° C.

The polyester resin preferably has a glass transition temperature (Tg) of not less than 50° C.

The sodium polycarboxylate is preferably at least one sodium polycarboxylate selected from the group consisting of sodium polyacrylate, sodium polymaleate and sodium acrylate maleate copolymer.

The coating liquid preferably contains the sodium polycarboxylate at 2 to 20 wt % based on 100 wt % of the ultrafine inorganic compound particles.

A gas barrier laminate according to the present invention comprises a substrate and a gas barrier layer formed on the substrate, wherein the gas barrier layer comprises a layer (A) formed from the above-described coating liquid and a layer (B) containing a polycarboxylic acid polymer.

In the gas barrier layer, the layer (A) and the layer (B) are preferably adjacent to each other.

The layer (A) preferably has a weight per unit area that is at least ⅓ times the weight per unit area of the layer (B).

The layer (A) preferably contains the ultrafine inorganic compound particles at 65 to 90 wt % based on 100 wt % of the layer (A).

The gas barrier laminate may comprise another substrate that is laminated on at least one of the substrate and the gas barrier layer via an adhesive layer.

Advantageous Effects of Invention

The coating liquids of the invention contain ultrafine inorganic compound particles with good dispersibility. The gas barrier laminates of the invention have a layer formed from the coating liquid, and achieve excellent transparency and gas barrier properties.

DESCRIPTION OF EMBODIMENTS

The present invention will be described in detail below.

A coating liquid according to the present invention comprises ultrafine inorganic compound particles, a polyester resin, a sodium polycarboxylate and water. Preferably, the coating liquid further comprises a water-dispersible isocyanate compound. The coating liquids of the invention will be otherwise referred to as the coating liquids (a).

Hereinbelow, the components contained in the coating liquids (a) will be described.

[Ultrafine Inorganic Compound Particles]

The coating liquids (a) of the invention contain ultrafine inorganic compound particles. As used herein, the ultrafine particles refer to particles that are not visible with a light microscope, ranging from 1 nm to 1000 nm in particle diameter.

The ultrafine inorganic compound particles usually have an average primary particle diameter measured by a laser diffraction scattering method of not more than 200 nm, preferably not more than 150 nm, and most preferably not more than 100 nm. The lower limit of the average primary particle diameter is not particularly limited, but is usually 5 nm or above. The ultrafine inorganic compound particles having the above diameters achieve excellent dispersibility, and the obtainable coating liquids (a) can form highly transparent layers on substrates such as films by application and subsequent drying.

Preferred ultrafine inorganic compound particles are ultrafine particles of polyvalent metal compounds. The polyvalent metals are preferably zinc, calcium, magnesium, copper and aluminum. Preferred polyvalent metal compounds are oxides, hydroxides and carbonates of these polyvalent metals. In particular, zinc oxide and calcium carbonate are preferable, and zinc oxide is more preferable from the viewpoint of gas barrier properties. That is, the ultrafine inorganic compound particles used in the invention are preferably ultrafine particles of zinc oxide (hereinafter, also ultrafine zinc oxide particles).

Commercial ultrafine inorganic compound particles may be used in the invention. Exemplary commercial ultrafine zinc oxide particles include FINEX 50 (manufactured by SAKAI CHEMICAL INDUSTRY CO., LTD., average primary particle diameter: 20 nm) and ZINCOX SUPER F-2 (manufactured by HakusuiTech Co., Ltd., average primary particle diameter: 65 nm).

[Polyester Resins]

The coating liquids (a) of the invention contain a polyester resin. From the viewpoint of application properties, the polyester resin is preferably dissolved or dispersed in the coating liquid (a).

The polyester resins used in the invention usually have an acid value of not more than 15 mg KOH/g, preferably not more than 10 mg KOH/g, and more preferably not more than 8 mg KOH/g. This acid value ensures that the coating liquids show excellent application properties and layers from the coating liquids achieve excellent water resistance.

The lower limit of the acid value of the polyester resins is not particularly limited, but is usually 0.05 mg KOH/g or above in view of the measurement accuracy limit. The acid value of the polyester resins may be determined in accordance with JIS K 0070.

The polyester resins usually have a glass transition temperature (Tg) of not less than −30° C. The glass transition temperature (Tg) is preferably in the range of −30 to 20° C., or is preferably not less than 50° C. When the glass transition temperature (Tg) is 50° C. or above, it is more preferably 50 to 80° C. The glass transition temperature in the above range ensures that layers from the coating liquids (a) achieve excellent water resistance and heat resistance.

The polyester resins used in the invention usually have a number average molecular weight of 5,000 to 50,000, preferably 9,000 to 40,000, and more preferably 10,000 to 30,000. The molecular weight in this range ensures that the coating liquids (a) show excellent application properties and layers from the coating liquids (a) achieve excellent water resistance and heat resistance.

The polyester resins may contain hydroxyl groups as long as the water resistance of layers formed from the coating liquids (a) is not deteriorated. The hydroxyl value thereof is usually not more than 30 mg KOH/g, and preferably not more than 20 mg KOH/g. The lower limit of the hydroxyl value of the polyester resins is not particularly limited, but is usually 0.05 mg KOH/g or above in view of the measurement accuracy limit.

The polyester resins for use in the invention may be usually obtained by copolymerizing polybasic acids or polybasic acid anhydrides with polyhydric alcohols. The polybasic acids, the polybasic acid anhydrides and the polyhydric alcohols are not particularly limited. For example, the following compounds may be used.

Examples of the polybasic acids include aromatic polybasic acids, aliphatic polybasic acids and alicyclic polybasic acids. The polybasic acids may be dibasic acids, tribasic acids or higher polybasic acids.

Examples of the aromatic dibasic acids, namely aromatic dicarboxylic acids, include terephthalic acid, isophthalic acid, orthophthalic acid, naphthalene dicarboxylic acid and biphenyl dicarboxylic acid. Examples of the aliphatic dibasic acids, namely aliphatic dicarboxylic acids, include saturated aliphatic dicarboxylic acids such as oxalic acid, succinic acid, adipic acid, sebacic acid, dodecane diacid, eicosane diacid and hydrogenated dimer acids, and unsaturated aliphatic dicarboxylic acids such as fumaric acid, maleic acid, itaconic acid, citraconic acid and dimer acids. Examples of the alicyclic dibasic acids, namely alicyclic dicarboxylic acids, include 1,4-cyclohexanedicarboxylic acid, 1,3-cyclohexanedicarboxylic acid, 1,2-cyclohexanedicarboxylic acid, 2,5-norbornenedicarboxylic acid and tetrahydrophthalic acid.

Examples of the tribasic or higher polybasic acids include trimellitic acid, pyromellitic acid, benzophenonetetracarboxylic acid, trimesic acid, ethylene glycol bis(anhydrotrimellitate), glycerol tris(anhydrotrimellitate) and 1,2,3,4-butanetetracarboxylic acid.

Examples of the polybasic acid anhydrides include dibasic acid anhydrides such as phthalic acid anhydride, succinic acid anhydride, maleic acid anhydride, itaconic acid anhydride, citraconic acid anhydride, 2,5-norbornenedicarboxylic acid anhydride and tetrahydrophthalic acid anhydride. Examples of the polybasic acid anhydrides further include tribasic or higher polybasic acid anhydrides such as trimellitic acid anhydride, pyromellitic acid anhydride and benzophenonetetracarboxylic acid anhydride.

In the use of the polybasic acids and the polybasic acid anhydrides, the total amount of the tribasic and higher polybasic acids and the tribasic and higher polybasic acid anhydrides is preferably not more than 5 mol % based on 100 mol % of the total of the polybasic acids and the polybasic acid anhydrides used in the production of the polyester resins. This control suppresses gelation in the production of the polyester resins.

Of the polybasic acids and the polybasic acid anhydrides, aromatic dicarboxylic acids and aromatic dicarboxylic acid anhydrides such as phthalic acid anhydride are preferable.

Examples of the polyhydric alcohols include C2-10 aliphatic glycols, C6-12 alicyclic glycols, and ether bond-containing glycols. The C2-10 aliphatic glycols include ethylene glycol, 1,2-propanediol, 1,3-propanediol, 1,4-butanediol, 2-methyl-1,3-propanediol, 1,5-heptanediol, neopentylglycol, 1,6-hexanediol, 3-methyl-1,5-pentanediol, 1,9-nonanediol and 2-ethyl-2-butylpropanediol. The C6-12 alicyclic glycols include 1,4-cyclohexanedimethanol. The ether bond-containing glycols include diethylene glycol, triethylene glycol, dipropylene glycol, polytetramethylene glycol, polyethylene glycol and polypropylene glycol.

Usable polyhydric alcohol components further include adducts of bisphenols (for example, bisphenols A and bisphenols S) with ethylene oxide or propylene oxide such as 2,2-bis(4-hydroxyethoxyphenyl)propane.

Furthermore, trihydric or higher polyhydric alcohols such as glycerol, trimethylolethane, trimethylolpropane and pentaerythritol may be used. However, a higher proportion of the trihydric or higher polyhydric alcohols increases the probability of gelation in the production of the polyester resins. Thus, the amount of the trihydric or higher polyhydric alcohols is preferably not more than 5 mol % based on 100 mol % of the polyhydric alcohols used in the production of the polyester resins.

Preferred polyhydric alcohols are ethylene glycol and neopentyl glycol which are inexpensive. It is preferred that the total amount of ethylene glycol and neopentyl glycol is not less than 50 mol %, and more preferably not less than 70 mol % based on 100 mol % of the polyhydric alcohols.

As described above, the polyester resins for use in the invention may be obtained by copolymerizing the polybasic acids or the polybasic acid anhydrides with the polyhydric alcohols. The copolymerization may further involve monocarboxylic acids, monoalcohols and hydroxycarboxylic acids, in detail lauric acid, myristic acid, palmitic acid, stearic acid, oleic acid, linoleic acid, linolenic acid, benzoic acid, p-tert-butylbenzoic acid, cyclohexanoic acid, 4-hydroxyphenylstearic acid, stearyl alcohol, 2-phenoxyethanol, s-caprolactone, lactic acid, β-hydroxybutyric acid and p-hydroxybenzoic acid.

The polyester resins may be produced by polycondensing one or more kinds of the polybasic acids and the polybasic acid anhydrides with one or more kinds of the polyhydric alcohols by known methods. For example, all the monomers and/or low polymers thereof may be esterified in an inert atmosphere at 180 to 260° C. for about 2.5 to 10 hours, and the product may be successively polycondensed to the desired molecular weight in the presence of an ester exchange catalyst at a reduced pressure of 130 Pa or below and a temperature of 220 to 280° C., thereby obtaining the polyester resins. To achieve the desired acid value or hydroxyl value of the polyester resins, the above polycondensation may be followed by depolymerization in an inert atmosphere by adding additional polybasic acids or polyhydric alcohol components.

The depolymerization is often accompanied by bubbling in the resin, and the bubbles can prevent discharging in pelletization. In such cases, the system may be evacuated again after the depolymerization to defoam the product. The evacuation may be preferably effected to a pressure of 67,000 Pa or below, and more preferably 10,000 Pa or below. Evacuation at a pressure above 67,000 Pa requires a long time to defoam the product and is thus not preferable.

To achieve the desired acid value of the polyester resins, the polycondensation may be followed by an addition reaction of the hydroxyl groups of the polyester resin with an additional polybasic acid anhydride in an inert atmosphere.

The polyester resins used in the invention preferably have a carboxyl group that is introduced by depolymerization using a polybasic acid and/or addition reaction using a polybasic acid anhydride. The molecular weight and the acid value of the polyester resins may be easily controlled by the introduction of the carboxyl groups by depolymerization and/or addition reaction. The polybasic acids used in the depolymerization are preferably tribasic or higher polybasic acids. The use of tribasic or higher polybasic acids makes it possible that the desired acid value is obtained while suppressing the lowering in molecular weight of the polyester resins by the depolymerization. Further, although the details are unclear, the use of tribasic or higher polybasic acids and tribasic or higher polybasic acid anhydrides leads to aqueous dispersions which achieve still improved storage stability.

The polybasic acids and the polybasic acid anhydrides used in the depolymerization and/or the addition reaction include the polybasic acid components described as components for the polyester resins. Of these components, aromatic polybasic acids and aromatic polybasic acid anhydrides are preferable. In detail, aromatic dicarboxylic acids such as terephthalic acid and isophthalic acid, aromatic dicarboxylic acid anhydrides such as phthalic acid anhydride, tribasic acids such as trimellitic acid, and tribasic acid anhydrides such as trimellitic acid anhydride are preferable. In particular, the use of trimellitic acid anhydride is preferable because depolymerization and addition reaction are considered to take place in parallel with each other when trimellitic acid anhydride is used, and thus the desired acid value can be achieved while minimizing the reduction in molecular weight of the polyester resins by the depolymerization. In the invention, the polyester resins may be used singly, or two or more kinds may be used in combination.

The coating liquids (a) of the invention contain the polyester resins as described above. The polyester resins are preferably derived from aqueous polyester resin dispersions described below.

When the coating liquid (a) contains a polyester resin derived from an aqueous polyester resin dispersion, the coating liquid (a) can give highly water resistant layers.

[Aqueous Polyester Resin Dispersions]

The coating liquids (a) of the invention contain the polyester resins. The polyester resins are preferably derived from aqueous polyester resin dispersions.

The aqueous polyester resin dispersion contains the polyester resin described above and water as a dispersion medium. The dispersion preferably contains a basic compound to allow the polyester resin to favorably disperse in water. The aqueous polyester resin dispersions may further contain other components. Such additional components are not particularly limited and include surfactants, organic solvents, curing agents, compounds having protective colloid action, pigments such as titanium oxide, zinc oxide and carbon black, dyes, and aqueous resins such as aqueous urethane resins, aqueous olefin resins and aqueous acrylic resins.

Commercial aqueous polyester resin dispersions may be used, with examples including Elitel KT-8803 manufactured by UNITIKA LTD., Elitel KA-5034 manufactured by UNITIKA LTD., Elitel KT-0507 manufactured by UNITIKA LTD., Elitel KT-9204 manufactured by UNITIKA LTD., Vylonal MD-1200 manufactured by TOYOBO Co., LTD., Vylonal MD-1480 manufactured by TOYOBO Co., LTD., and PESRESIN A124GP manufactured by TAKAMATSU OIL & FAT CO., LTD.

[Sodium Polycarboxylates]

The coating liquids (a) of the invention contain a sodium polycarboxylate. The sodium polycarboxylates are highly adsorptive to the surface of the ultrafine inorganic compound particles, and the sodium polycarboxylates adsorbed to the surface of the ultrafine inorganic compound particles are easily ionized to generate electric repulsive force which contributes to favorable dispersion of the ultrafine inorganic compound particles. In a preferred embodiment of the gas barrier laminates of the invention, the laminate contains a layer (A) formed from the coating liquid (a) and a layer (B) containing a polycarboxylic acid polymer that are adjacent to each other. The sodium polycarboxylate contained in the coating liquid (a) is physically and chemically similar to the polycarboxylic acid contained in the layer (B). Accordingly, the reaction between the adjacent layer (A) and layer (B) does not deteriorate transparency, and the obtainable gas barrier laminates achieve excellent transparency.

Examples of the sodium polycarboxylates contained in the coating liquids (a) include sodium salts of homopolymers of unsaturated carboxylic acids such as acrylic acid, maleic acid, methacrylic acid, itaconic acid, fumaric acid and crotonic acid, and sodium salts of copolymers obtained by copolymerization using at least one of these unsaturated carboxylic acids.

Examples of the sodium polycarboxylates further include homopolymers of sodium salts of the above unsaturated carboxylic acids, and copolymers obtained by copolymerization using at least one of the sodium unsaturated carboxylates. That is, the sodium polycarboxylates used in the invention may be sodium polycarboxylates obtained by neutralizing with sodium the carboxyl groups of carboxylic acid polymers resulting from (co)polymerization of the unsaturated carboxylic acids, or may be sodium polycarboxylates obtained by (co)polymerizing the sodium unsaturated carboxylates.

Of the sodium salts of copolymers obtained by copolymerization using at least one of the above unsaturated carboxylic acids, sodium salts of copolymers obtained by copolymerization using two or more of the unsaturated carboxylic acids are preferable. Of the copolymers obtained by copolymerization using at least one of the sodium unsaturated carboxylates, copolymers obtained by copolymerization using two or more of the sodium unsaturated carboxylates are preferable. The copolymerization may involve monomers other than the unsaturated carboxylic acids and the sodium unsaturated carboxylates.

From the viewpoints of dispersibility of the ultrafine inorganic compound particles and gas barrier properties of the gas barrier laminates having a layer from the coating liquid (a), the sodium polycarboxylate is preferably at least one selected from sodium polyacrylate, sodium polymaleate and sodium acrylate maleate copolymer.

From the viewpoints of dispersibility of the ultrafine inorganic compound particles and gas barrier properties of the gas barrier laminates having a layer from the coating liquid (a), the coating liquid (a) preferably contains the sodium polycarboxylate at 2 to 20 wt %, and more preferably 3 to 16 wt % based on 100 wt % of the ultrafine inorganic compound particles.

[Water]

The coating liquids (a) of the invention contain water. The water used in the invention is not particularly limited, and may be for example running water, ion exchange water, distilled water or ultrapure water.

When the aqueous polyester resin dispersion is used in the production of the coating liquid (a), the water in the aqueous polyester resin dispersion is used as at least part of the water in the coating liquid (a).

[Water-Dispersible Isocyanate Compounds]

When the coating liquid (a) contains a water-dispersible isocyanate compound, the coating liquid shows excellent film-forming properties and can form a layer (A) that is excellent in hot water resistance and adhesion.

The water-dispersible isocyanate compounds refer to compounds that are dispersible in water and have at least one isocyanate group in the molecule.

Examples of the water-dispersible isocyanate compounds include isocyanate compounds that are rendered self-emulsifiable by modifying part of the isocyanate groups of organic polyisocyanates having two or more isocyanate groups with hydrophilic groups such as polyethylene oxide, carboxyl groups or sulfonic acid groups, and isocyanate compounds that are rendered water-dispersible by forced emulsification with surfactants or the like.

Examples of the organic polyisocyanates include but are not limited to phenylene diisocyanate, tolylene diisocyanate, diphenylmethane diisocyanate, xylylene diisocyanate, naphthylene diisocyanate, isophorone diisocyanate, hexamethylene diisocyanate, hydrogenated diphenylmethane diisocyanate, polymethylene polyphenyl polyisocyanate, hydrogenated toluene diisocyanate and tetramethylene xylylene diisocyanate. These compounds may be used singly, or two or more kinds may be used in combination.

Suitable water-dispersible isocyanate compounds further include prepolymers derived from the above organic polyisocyanates, and so-called blocked polyisocyanate compounds that are organic polyisocyanates in which part of the isocyanate groups are blocked with alcohols, phenols, oximes, mercaptans, amides, imides or lactams.

These various compounds described above may be used as the water-dispersible isocyanate compounds.

Further, commercially available water-dispersible isocyanate compounds may be used, with examples including Liofol Hardener UR5889-21 manufactured by Henkel, DURANATE WB40-100 manufactured by Asahi Kasei Chemicals Corporation, and TAKENATE WD-725 manufactured by Mitsui Chemicals Polyurethanes Inc.

[Coating Liquids (a)]

The coating liquid according to the present invention contains the ultrafine inorganic compound particles, the polyester resin, the sodium polycarboxylate and water. Preferably, the coating liquid further contains the water-dispersible isocyanate compound. The coating liquid (a) contains the ultrafine inorganic compound particles with excellent dispersibility. As a result, a layer (A) formed from the coating liquid (a) has a substantially uniform concentration of the ultrafine inorganic compound particles within the layer. The gas barrier laminates having this layer show excellent transparency and gas barrier properties.

The coating liquids (a) of the invention may contain components other than the ultrafine inorganic compound particles, the polyester resins, the sodium polycarboxylates, water and the water-dispersible isocyanate compounds. Examples of such additional components include organic solvents, softeners, stabilizers, film-forming agents and thickening agents.

In view of improvements in application properties and drying efficiency, the organic solvents include ethyl alcohol, isopropyl alcohol and ethylene glycol monobutyl ether. The coating liquid (a) may contain a single, or two or more kinds of these organic solvents.

Of the components contained in the coating liquid (a), namely the ultrafine inorganic compound particles, the polyester resins, the sodium polycarboxylates, the water-dispersible isocyanate compounds which are preferably used and the optional other components, the total amount of the solids, i.e., the solid content in the coating liquid (a), is usually 3 to 30 wt %, and preferably 5 to 20 wt % based on 100 wt % of the coating liquid.

The coating liquid (a) may usually contain the ultrafine inorganic compound particles at 65 to 90 wt %, and preferably 70 to 90 wt % based on 100 wt % of the solid content. This content of the ultrafine inorganic compound particles ensures that the coating liquid (a) shows excellent application properties and the gas barrier laminates having a layer (A) from the coating liquid (a) have excellent gas barrier properties.

The coating liquid (a) may usually contain the polyester resins at 2 to 20 wt %, and preferably 2 to 15 wt % based on 100 wt % of the solid content. This content of the polyester resins ensures that the gas barrier laminates having a layer (A) from the coating liquid (a) have excellent water resistance and heat resistance.

The coating liquid (a) may usually contain the sodium polycarboxylates at 2 to 20 wt %, and preferably 3 to 16 wt % based on 100 wt % of the ultrafine inorganic compound particles. This content of the sodium polycarboxylates ensures that the coating liquid (a) contains the components with good dispersibility and the gas barrier laminates having a layer (A) from the coating liquid (a) have excellent gas barrier properties.

When the coating liquid (a) contains the water-dispersible isocyanate compounds, the content of the water-dispersible isocyanate compounds may be usually 1 to 20 wt %, and preferably 3 to 15 wt % based on 100 wt % of the solid content. This content of the water-dispersible isocyanate compounds ensures that a layer (A) formed from the coating liquid (a) shows excellent adhesion when another substrate is laminated thereon via an adhesive layer.

When the coating liquid (a) contains other solid components, the content of such other solid components is usually less than 5 wt %, and preferably less than 3 wt % based on 100 wt % of the above solid content.

The coating liquids (a) may be prepared by any methods without limitation as long as the aforementioned components are uniformly mixed together.

As already described, the polyester resin is preferably derived from the aqueous polyester resin dispersion. That is, the coating liquid (a) is preferably obtained by mixing water, the ultrafine inorganic compound particles, the aqueous polyester resin dispersion and the sodium polycarboxylate. Since the aqueous polyester resin dispersion contains water, the coating liquid (a) obtained by mixing the ultrafine inorganic compound particles, the aqueous polyester resin dispersion and the sodium polycarboxylate contains the ultrafine inorganic compound particles, the polyester resin, the sodium polycarboxylate and water. However, water in addition to the water contained in the aqueous polyester resin dispersion is preferably used in the coating liquid (a).

In an exemplary process for the production of the coating liquids (a), the ultrafine inorganic compound particles and the sodium polycarboxylate are added to distilled water, the agglomerated primary particles are broken with use of a bead mill, a high-speed stirrer or the like to give an aqueous dispersion of the ultrafine inorganic compound particles, then distilled water, the aqueous polyester resin dispersion and the water-dispersible isocyanate compound are added to the aqueous dispersion of the ultrafine inorganic compound particles followed by stirring, and optionally an organic solvent such as isopropyl alcohol is added and mixed together by stirring, thereby producing the coating liquid (a). Of the bead mills, high-speed stirrers and the like used in the production of the aqueous dispersion of the ultrafine inorganic compound particles, the use of bead mills is preferable because the obtainable gas barrier laminates tend to have a smaller haze.

In an alternative process of producing the coating liquids (a), distilled water is admixed with the water-dispersible isocyanate compound by stirring to give an aqueous dispersion of the water-dispersible isocyanate compound, an aqueous dispersion of the ultrafine inorganic compound particles is obtained as described above and the aqueous polyester resin dispersion is admixed therewith by stirring to give a dispersion, the dispersion is then combined and mixed with the aqueous dispersion of the water-dispersible isocyanate compound, and optionally an organic solvent such as isopropyl alcohol is added and mixed together by stirring, thereby producing the coating liquid (a).

[Gas Barrier Laminates]

A gas barrier laminate according to the invention comprises a substrate and a gas barrier layer formed on the substrate, wherein the gas barrier layer comprises a layer (A) formed from the above-described coating liquid (a) and a layer (B) containing a polycarboxylic acid polymer. In the gas barrier laminates, the gas barrier layer preferably has the layer (A) and the layer (B) adjacent to each other. The gas barrier laminates may have another substrate that is laminated on at least one of the substrate and the gas barrier layer via an adhesive layer.

That is, the multilayer structures of the gas barrier laminates of the invention include substrate/gas barrier layer, substrate/gas barrier layer/adhesive layer/another substrate, another substrate/adhesive layer/substrate/gas barrier layer, and another substrate/adhesive layer/substrate/gas barrier layer/adhesive layer/another substrate.

The gas barrier laminates have the layer (A) that is formed from the coating liquid (a) in which the ultrafine inorganic compound particles are dispersed with good dispersibility. As a result, the gas barrier laminates achieve excellent transparency and gas barrier properties.

In detail, the haze of the gas barrier laminates is preferably not more than 10%, and more preferably not more than 7% according to a measurement with a haze meter (Haze Meter NDH2000 manufactured by NIPPON DENSHOKU INDUSTRIES CO., LTD.). The lower limit of the haze is not particularly limited, but is usually 2% or above.

The gas barrier laminates of the invention have an oxygen permeability measured on a sample area of 50 cm$^2$ at 20° C. and 80% relative humidity (RH) on both sides in accordance with B method (equal pressure method) in JIS K-7126 and a method described in ASTM D 3985, of not more than 200 cm$^3$/m$^2$·day·MPa, preferably not more than 100 cm$^3$/m$^2$·day·MPa, more preferably not more than 80 cm$^3$/m$^2$·day·MPa, and particularly preferably not more than 50 cm$^3$/m$^2$·day·MPa. Lower oxygen permeability is more preferable. The lower limit thereof is not particularly limited, but is usually 0.1 cm$^3$/m$^2$·day·MPa or above.

Further, the gas barrier laminates have excellent peel strength between layers. In detail, the peel strength of the gas barrier laminates is preferably not less than 2.0 N/15 mm, more preferably not less than 3.0 N/15 mm, and particularly preferably such that the layers are not peeled. The peel strength herein is measured by a T-shape peeling test on a 15 mm wide test piece at a rate of 200 ram/min in accordance with JIS K-6854-3 using a tensile tester (TENSILON RC-1210A manufactured by ORIENTEC Co., LTD.).

[Substrates]

The gas barrier laminates of the invention have a substrate and the gas barrier layer on the substrate.

The substrates are not particularly limited. Examples include films, sheets, bottles, cups, trays, tanks and tubes, with films and sheets being preferable.

The thickness of the substrates varies depending on the applications, but is usually 5 μm to 2 cm. In the applications for films and sheets, the substrate thickness is preferably 5 to 800 μm, and more preferably 10 to 500 μm. In the applications for bottles, cups, trays, tanks and the like, the substrate thickness is preferably 100 μm to 1 cm, and more preferably 150 μm to 8 mm. In the tube applications, the substrate thickness is preferably 20 μm to 2 cm.

When the thickness of the substrates is in the above ranges, excellent workability and productivity are achieved in the respective applications.

Examples of the substrate materials include plastics (including metal-deposited plastics and metal compound-deposited plastics), papers and rubbers. Of these materials, plastics are preferable from the viewpoint of adhesion between the substrate and the gas barrier layer.

Examples of the plastic materials include polyolefin polymers such as low-density polyethylene, high-density polyethylene, linear low-densitypolyethylene, polypropylene, poly-4-methylpentene and cyclic polyolefins, copolymers thereof, and acid-modified products of these polymers; polyvinyl acetate and vinyl acetate copolymers such as ethylene/vinyl acetate copolymer, saponified ethylene/vinyl acetate copolymer and polyvinyl alcohols; polyester polymers such as polyethylene terephthalate, polybutylene terephthalate, polyethylene naphthalate, poly-s-caprolactone, polyhydroxybutyrate and polyhydroxyvalerate, and copolymers of these polymers; polyamide polymers such as nylon 6, nylon 66, nylon 12, nylon 6/nylon 66 copolymer, nylon 6/nylon 12 copolymer and metaxylene adipamide/nylon 6 copolymer, and copolymers of these polymers; polyether polymers such as polyethylene glycol, polyethersulfone, polyphenylene sulfide and polyphenylene oxide; chlorine- or fluorine-containing polymers such as polyvinyl chloride, polyvinylidene chloride, polyvinyl fluoride and polyvinylidene fluoride, and copolymers of these polymers; acrylic polymers such as polymethyl acrylate, polyethyl acrylate, polymethyl methacrylate, polyethyl methacrylate and polyacrylonitrile, and copolymers of these polymers; polyimide polymers and copolymers thereof; resins such as alkyd resins, melamine resins, acrylic resins, pyroxylins, polyurethane resins, unsaturated polyester resins, phenolic resins, amino resins, fluororesins and coating epoxy resins; and natural polymer compounds such as cellulose, starch, pullulan, chitin, chitosan, glucomannan, agarose and gelatin, and mixtures thereof.

In order to improve adhesion between the substrate and the gas barrier layer, the surface of the substrates may be activated by treatments such as corona treatment, flame treatment and plasma treatment. Further, the substrates may have an anchor coating layer on the surface.

Examples of the resins used in the anchor coating layers include alkyd resins, melamine resins, acrylic resins, pyroxylins, polyurethane resins, polyester resins, phenolic resins, amino resins, fluororesins, epoxy resins, and carbodiimide group-containing resins. Of these, polyurethane resins, polyester resins, acrylic resins, epoxy resins, and carbodiimide group-containing resins are preferred. These resins may be used singly, or two or more kinds may be used in combination.

Of the above resins, polyurethane resins are particularly preferred. Preferred polyols that are constituents for the polyurethane resins are polyester polyols. Examples of the polyester polyols include those obtained by reacting polyvalent carboxylic acids with glycols.

Exemplary polyisocyanates that are constituents for the polyurethane resins include 2,4-tolylene diisocyanate, 2,6-tolylene diisocyanate, m-phenylene diisocyanate, p-phenylene diisocyanate, 4,4'-diphenylmethane diisocyanate, hexamethylene diisocyanate, xylylene diisocyanate and isophorone diisocyanate.

When the substrate has the anchor coating layer, the thickness of the anchor coating layer is preferably 0.01 to and more preferably 0.05 to 1 µm from the viewpoints of adhesion and appearance. The weight per unit area of the anchor coating layer is preferably in the range of 0.01 to 1 $g/m^2$, and more preferably 0.05 to 1 $g/m^2$.

When a layer (B) of the gas barrier laminate is provided adjacent to the substrate, the substrate may have an anchor coating layer including a carbodiimide group-containing resin.

[Gas Barrier Layers]

The gas barrier layer in the gas barrier laminate of the invention has a layer (A) formed from the coating liquid (a) and a layer (B) containing a polycarboxylic acid polymer.

From the viewpoint of productivity of the gas barrier laminates, the layer (A) and the layer (B) in the gas barrier layer are preferably adjacent to each other.

The gas barrier layer of the gas barrier laminate has at least one layer (A) and at least one layer (B), or may have one or more layers each. That is, the gas barrier layers may have a two-layer structure: layer (A)/layer (B) or layer (B)/layer (A), a three-layer structure: layer (A)/layer (B)/layer (A) or layer (B)/layer (A)/layer (B), or a four-layer structure: layer (A)/layer (B)/layer (A)/layer (B) or layer (B)/layer (A)/layer (B)/layer (A), from the substrate side.

In the gas barrier layers of the gas barrier laminates, it is preferable from the viewpoint of gas barrier properties of the gas barrier laminates that the layer (A) has a weight per unit area that is at least $1/3$ times, and more preferably at least $1/2$ times the weight per unit area of the layer (B). When the layer (A) has this weight per unit area, the gas barrier laminates show excellent gas barrier properties. Further, the weight per unit area of the layer (A) is preferably not more than 10 times the weight per unit area of the layer (B). Within this range, the application amount is appropriate, the gas barrier laminates show excellent peel strength, and the production of the gas barrier laminates is cost advantageous. In the case where the laminates have a plurality of the layers (A) or the layers (B), the weight per unit area of the layers (A) or the layers (B) indicates the weight per unit area of the total of the layers.

[Layers (A)]

The layer (A) of the gas barrier laminates is formed from the coating liquid (a).

The layer (A) may be formed by any methods without limitation. In a usual embodiment, it is formed by applying the coating liquid (a) on the substrate or the layer (B) described later, and drying the coating liquid.

The layers (A) formed from the coating liquid (a) contain the ultrafine inorganic compound particles, the polyester resin and the sodium polycarboxylate.

From the viewpoint of gas barrier properties of the gas barrier laminates, the layer (A) preferably contains the ultrafine inorganic compound particles at 65 to 90 wt %, and more preferably 70 to 90 wt % based on 100 wt % of the layer (A). Since the layer (A) is formed from the coating liquid (a), the proportion of the ultrafine inorganic compound particles in the layer (A) is usually equal to the content of the ultrafine inorganic compound particles relative to the solid content in the coating liquid (a).

The weight per unit area of the layers (A) is preferably in the range of 0.1 to 10 $g/m^2$, more preferably 0.1 to 6 $g/m^2$, and still more preferably 0.1 to 2 $g/m^2$.

The thickness of the layers (A) is preferably in the range of 0.05 to 5 µm, more preferably 0.1 to 3 µm, and still more preferably 0.1 to 1 µm. This thickness ensures excellent gas barrier properties and good appearance.

[Layers (B)]

The layer (B) of the gas barrier laminates contains a polycarboxylic acid polymer.

The layers (B) are not particularly limited as long as they contain a polycarboxylic acid polymer. From the viewpoint of gas barrier properties, the layers preferably further contain at least one silicon-containing compound (i) selected from silane coupling agents, hydrolysates thereof, and condensates of these compounds.

The weight per unit area of the layers (B) is preferably in the range of 0.1 to 10 g/m$^2$, more preferably 0.1 to 6 g/m$^2$, and still more preferably 0.1 to 2 g/m$^2$.

The thickness of the layers (B) is preferably in the range of 0.05 to 5 μm, more preferably 0.1 to 3 and still more preferably 0.1 to 1 μm. This thickness ensures excellent gas barrier properties.

(Polycarboxylic Acid Polymers)

The layers (B) in the gas barrier laminates contain a polycarboxylic acid polymer. The polycarboxylic acid polymers refer to polymers having two or more carboxyl groups in the molecule. Examples of the polycarboxylic acid polymers include (co)polymers of ethylenically unsaturated carboxylic acids; copolymers of ethylenically unsaturated carboxylic acids and other ethylenically unsaturated monomers; and acid polysaccharides having a carboxyl group in the molecule, such as alginic acid, carboxymethyl cellulose and pectin. These polycarboxylic acid polymers may be used singly, or two or more kinds may be used in combination.

Examples of the ethylenically unsaturated carboxylic acids include acrylic acid, methacrylic acid, itaconic acid, maleic acid, fumaric acid and crotonic acid. Examples of the ethylenically unsaturated monomers copolymerizable with these ethylenically unsaturated carboxylic acids include ethylene, propylene, vinyl esters of saturated carboxylic acids such as vinyl acetate, alkyl acrylates, alkyl methacrylates, alkyl itaconates, vinyl chloride, vinylidene chloride, styrene, acrylamides and acrylonitrile.

Of the polycarboxylic acid polymers, preferred polymers from the viewpoint of gas barrier properties of the obtainable gas barrier laminates are polycarboxylic acid polymers that include structural units derived from at least one polymerizable monomer selected from acrylic acid, maleic acid, methacrylic acid, itaconic acid, fumaric acid and crotonic acid, and mixtures of these polymers. Particularly preferred polycarboxylic acid polymers are polymers that include structural units derived from at least one polymerizable monomer selected from acrylic acid, maleic acid, methacrylic acid and itaconic acid, and mixtures of these polymers. The polymers may be homopolymers or copolymers. The polymers preferably contain structural units derived from at least one polymerizable monomer selected from acrylic acid, maleic acid, methacrylic acid and itaconic acid at not less than 80 mol %, and more preferably not less than 90 mol % (based on 100 mol % of all the structural units). Possible structural units other than the above structural units include structural units derived from the aforementioned ethylenically unsaturated monomers copolymerizable with the ethylenically unsaturated carboxylic acids.

The polycarboxylic acid polymers used in the invention usually have a number average molecular weight in the range of 2,000 to 10,000,000. If the number average molecular weight is less than 2,000, the obtainable gas barrier laminates do not have sufficient water resistance and may be deteriorated in gas barrier properties or transparency or may be clouded by water. If the number average molecular weight exceeds 10,000,000, the formation of the layers (B) by application may suffer bad application properties due to increased viscosity. From the viewpoint of water resistance of the obtainable gas barrier laminates, the number average molecular weight of the polycarboxylic acid polymers is preferably in the range of 5,000 to 1,000,000. Herein, the number average molecular weight is determined by gel permeation chromatography (GPC) relative to polystyrene.

The polycarboxylic acid polymers may be used singly, or two or more kinds may be used in combination.

In the polycarboxylic acid polymers for use in the invention, part of the carboxyl groups may be neutralized with basic compounds beforehand. The basic compound is preferably at least one selected from polyvalent metal compounds, monovalent metal compounds and ammonia Neutralizing part of the carboxyl groups of the polycarboxylic acid polymers leads to further improved water resistance in the production of the gas barrier laminates. From the viewpoints of application properties or liquid stability of coating liquids (b) described later, the neutralization degree for the carboxyl groups is preferably not more than 30 mol %, and more preferably not more than 25 mol %.

(Silicon-Containing Compounds (i))

From the viewpoint of water resistance, the layer (B) in the gas barrier laminates preferably contains at least one silicon-containing compound (i) selected from silane coupling agents, hydrolysates thereof, and condensates of these compounds.

In the invention, the at least one silicon-containing compound (i) selected from silane coupling agents, hydrolysates thereof, and condensates of these compounds" will be otherwise simply referred to as the silicon-containing compound (i). Condensates of hydrolyzed silane coupling agents will be otherwise referred to as hydrolyzed condensates.

The silicon-containing compound (i) may be a silane coupling agent, a hydrolysate resulting from the hydrolysis of the compound, or a condensate of these compounds. For example, a silane coupling agent may be hydrolyzed and condensed by a sol-gel process to give a silicon-containing compound (i).

In general, silane coupling agents are easily hydrolyzed, and are readily condensed in the presence of acid or alkali. Accordingly, it is unlikely that the silicon-containing compound is present as a silane coupling agent alone, a hydrolysate thereof alone, or a condensate of these compounds alone. That is, the silicon-containing compound (i) is usually a mixture of a silane coupling agent, a hydrolysate thereof, and a condensate of these compounds. The hydrolysates include partial hydrolysates and complete hydrolysates.

Preferably, the silicon-containing compound (i) at least contains a hydrolyzed condensate. The hydrolyzed condensate may be produced by directly mixing a silane coupling agent with a liquid containing the above-described polycarboxylic acid polymer and water. Alternatively, a hydrolyzed condensate may be obtained before the compound is mixed with the polycarboxylic acid polymer. That is, water may be added to a silane coupling agent to hydrolyze and successively condensate the same.

Examples of the silane coupling agents include tetramethoxysilane, tetraethoxysilane, γ-glycidoxypropyltrimethoxysilane, γ-glycidoxypropyltriethoxysilane, γ-aminopropyltrimethoxysilane and γ-aminopropyltriethoxysilane, with γ-glycidoxypropyltrimethoxysilane and γ-aminopropyltrimethoxysilane being preferable. The silane coupling agents may be used singly, or two or more kinds may be used in combination.

When tetraalkoxysilanes such as tetramethoxysilane and tetraethoxysilane are used as the silane coupling agents, they are preferably used in combination with γ-glycidoxypropyltrimethoxysilane, γ-glycidoxypropyltriethoxysilane, γ-aminopropyltrimethoxysilane, γ-aminopropyltriethoxysilane or the like. The combined use provides higher water resistance.

When the silicon-containing compounds (i) include a hydrolyzed condensate, such hydrolyzed condensate is formed as a result of reactions in which at least part of the alkoxy groups (OR) of a silane coupling agent are converted to the hydroxyl groups and the resultant hydrolysate is repeatedly condensed into a compound in which silicon atoms (Si) are bonded via an oxygen atom.

When the layers (B) contain the silicon-containing compounds (i), the weight ratio of the polycarboxylic acid polymers and the silicon-containing compounds (i) (polycarboxylic acid polymers:silicon-containing compounds (i)) is preferably 99.5:0.5 to 80.0:20.0. Here, the weight of the silicon-containing compounds (i) other than the silane coupling agents is in terms of the silane coupling agents. In detail, since the silicon-containing compounds (i) are usually mixtures of silane coupling agents, hydrolysates thereof and condensates of these compounds, the weight of the silicon-containing compounds (i) is in terms of the silane coupling agents that are fed.

The above weight ratio ensures that the gas barrier layer achieves excellent adhesion with the substrate in the production of the gas barrier laminates and that the obtainable gas barrier laminates show excellent water resistance and are not clouded when exposed to cold water.

(Additives)

The layers (B) in the gas barrier laminates may contain various additives.

Examples of the additives include plasticizers, resins, dispersants, surfactants, softeners, stabilizers, antiblocking agents, film-forming agents, adhesives and oxygen absorbers.

For example, the plasticizers may be appropriately selected from known plasticizers. Examples of the plasticizers include ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol, polyvinyl alcohol, ethylene/vinyl alcohol copolymer, polyethylene oxide, sorbitol, mannitol, dulcitol, erythritol, glycerol, lactic acid, fatty acids, starch and phthalic acid esters. These plasticizers may be used as a mixture as required.

Of these, polyethylene glycol, polyvinyl alcohol, ethylene/vinyl alcohol copolymer, glycerol and starch are preferable from the viewpoints of stretchability and gas barrier properties.

The plasticizers provide improved stretchability of the layers (B), and the abuse resistance of the gas barrier laminates can be enhanced.

When the layers (B) contain the additives, the weight ratio of the polycarboxylic acid polymers and the additives (polycarboxylic acid polymers:additives) is usually in the range of 70:30 to 99.9:0.1, and preferably 80:20 to 98:2.

The layer (B) of the gas barrier laminates is usually formed from a coating liquid (b) containing the polycarboxylic acid polymer.

(Coating Liquids (b))

The coating liquid (b) contains at least the aforementioned polycarboxylic acid polymer, and preferably further contains at least one silicon-containing compound (i) selected from silane coupling agents, hydrolysates thereof, and condensates of these compounds. Where necessary, the liquid may contain the additives described above.

When the coating liquids (b) contain the silicon-containing compounds (i), the weight ratio of the polycarboxylic acid polymers and the silicon-containing compounds (i) (polycarboxylic acid polymers:silicon-containing compounds (i)) is preferably 99.5:0.5 to 80.0:20.0 from the viewpoint of gas barrier properties of the gas barrier laminates. Here, the weight of the silicon-containing compounds (i) other than the silane coupling agents is in terms of the silane coupling agents. In detail, since the silicon-containing compounds (i) are usually mixtures of silane coupling agents, hydrolysates thereof and condensates of these compounds, the weight of the silicon-containing compounds (i) is in terms of the silane coupling agents that are fed.

The above weight ratio ensures that the obtainable gas barrier laminates show excellent water resistance and are not clouded when exposed to cold water.

The solvents used in the coating liquids (b) are not particularly limited. However, when the silane coupling agents are contained, water is generally necessary in order to hydrolyze them. Exemplary solvents include water, organic solvents, and mixed solvents of water and organic solvents. Water is most preferable in terms of solubility of the polycarboxylic acid polymers. Organic solvents such as alcohols are preferable in order to improve solubility of the silane coupling agents and application properties of the coating liquids (b).

Preferably, at least one organic solvent selected from C1-5 lower alcohols and C3-5 lower ketones is used.

Specific examples of the organic solvents include methanol, ethanol, propanol, isopropanol, n-butanol, isobutanol, sec-butanol, tert-butanol, acetone and methyl ethyl ketone.

The water is preferably purified water such as distilled water or ion exchange water.

The mixed solvents of water and organic solvents preferably contain the above water and organic solvents. Mixed solvents containing water and C1-5 lower alcohols are more preferable. The mixed solvents usually contain water at 20 to 95 wt % and the organic solvents at 80 to 5 wt % (wherein the total of the water and the organic solvents is 100 wt %).

From the viewpoint of application properties with respect to the substrates or the layers (A), the solvents preferably include alcohols. Water is preferable in terms of cost.

From the viewpoints of gas barrier properties and application properties, the coating liquids (b) preferably have a total content (solid weight percentage) of the polycarboxylic acid polymers, the silicon-containing compounds (i) which are preferably used and the optional additives, in the range of 0.5 to 50 wt %, more preferably 0.8 to 30 wt %, and particularly preferably 1.0 to 20 wt % based on the total weight of the coating liquids (b).

[Other Substrates]

As described hereinabove, the gas barrier laminates of the invention may have another substrate that is laminated on at least one of the substrate and the gas barrier layer via an adhesive layer.

Laminating other substrates provides the gas barrier laminates with various properties. In detail, such laminations can add strength, sealing properties, easy seal-opening properties, designs, light-shielding properties and moisture proof properties.

The other substrates may be appropriately selected depending on the purposes. Plastic films are generally preferable. The other substrates may be laminates having two or more layers.

The other substrates are laminated via an adhesive layer. The lamination processes are not particularly limited, and dry lamination processes and extrusion lamination processes may be adopted. The thickness of these additional substrates is preferably 1 to 1000 μm, and more preferably 5 to 500 μm.

Other possible substrate materials include polyolefins, nylons and inorganic deposited nylons.

The additional substrate is provided on the substrate or the gas barrier layer via an adhesive layer. The adhesive layers are not particularly limited. When the additional substrate is laminated by a dry lamination process, a one-pack or two-pack polyurethane adhesive or acrylic adhesive may be used. When the other substrate is laminated by an extrusion lamination process, adhesive resins such as ethylene/vinyl acetate copolymer, ethylene/acrylic acid copolymer, ethylene/methacrylic acid copolymer and ionomer resins may be used.

[Processes for Producing Gas Barrier Laminates]

The gas barrier laminates described hereinabove may be produced by any processes without limitation. Exemplary processes are described below.

According to some typical embodiments of the processes for manufacturing the gas barrier laminates, the coating liquid (b) is applied on the substrate and dried to form the layer (B), and the coating liquid (a) is applied on the layer (B) and dried to give the layer (A) thereby producing a laminate having the substrate and the gas barrier layer on the substrate (hereinafter, also the process (1) for the production of the gas barrier laminates); the coating liquid (a) is applied on the substrate and dried to form the layer (A), and the coating liquid (b) is applied on the layer (A) and dried to give the layer (B) thereby producing a laminate having the substrate and the gas barrier layer on the substrate (hereinafter, also the process (2) for the production of the gas barrier laminates); and the additional substrate is laminated on at least one of the substrate and the gas barrier layer of the laminate obtained by the process (1) or (2) via an adhesive layer (hereinafter, also the process (3) for the production of the gas barrier laminates).

(Processes (1) for Production of Gas Barrier Laminates)

In the processes (1) for producing the gas barrier laminates, the coating liquid (b) is applied on the substrate and dried to form the layer (B), and the coating liquid (a) is applied on the layer (B) and dried to give the layer (A) thereby producing a laminate having the substrate and the gas barrier layer on the substrate.

The processes (1) for producing the gas barrier laminates include a step (step 1) of applying the coating liquid (b) on the substrate and drying the same to form the layer (B), and a subsequent step (step 2) of applying the coating liquid (a) and drying the same to give the layer (A).

The processes are described in detail below.

The coating liquid (b) may be applied to the substrate by any methods without limitation. Exemplary methods are casting, dipping, roll coating, gravure coating, screen printing, reverse coating, spray coating, kit coating, die coating, metalling bar coating, coating with chamber blade system and curtain coating.

After the coating liquid (b) is applied on the substrate, the solvent of the coating liquid (b) is removed by drying to form the layer (B) on the substrate. The drying methods are not particularly limited. Exemplary methods are hot air drying, hot roll drying, infrared heating and microwave heating. These methods may be used singly or in combination. The drying temperature is not particularly limited, but is preferably 50 to 160° C. when the water or the water/organic solvent mixed solvent as described hereinabove is used as the solvent. The drying pressure is preferably atmospheric pressure or reduced pressure, and is preferably atmospheric pressure from the viewpoint of simple equipment.

To increase the adhesion between the substrate and the layer (B), the substrate preferably has an anchor coating layer on the surface.

The anchor coating agents for forming the anchor coating layers include polymer materials such as polyurethane materials, polyester materials and acrylic materials. In particular, preferred anchor coating agents are two-pack polyurethane polymer materials that contain a polyester polyol-containing main agent and an isocyanate-containing curing agent.

When the coating liquid (b) contains at least one silicon-containing compound (i) selected from silane coupling agents, hydrolysates thereof and condensates of these compounds, heat treatment may be performed after the completion (or substantial completion) of the drying or after the completion of aging treatment described later, in order to increase the proportion of condensate relative to the silicon-containing compound in the layer (B).

The heat treatment is usually performed at 120 to 240° C., preferably 150 to 230° C. for 10 seconds to 30 minutes, preferably 20 seconds to 20 minutes.

The drying, the aging treatment and the heat treatment have partially similar conditions such as temperature. These treatments do not need to be clearly separated and may be performed consecutively.

The coating liquid (b) is preferably applied and dried such that the obtainable layer (B) has a weight per unit area in the range of 0.1 to 10 $g/m^2$, more preferably 0.1 to 6 $g/m^2$, and still more preferably 0.1 to 2 $g/m^2$.

The coating liquid (b) is preferably applied and dried such that the thickness of the obtainable layer (B) is in the range of 0.05 to 5 μm, more preferably 0.1 to 3 μm, and still more preferably 0.1 to 1 μm.

After the layer (B) is formed on the substrate, the coating liquid (a) is applied on the layer (B) and dried to give the layer (A), thereby producing a gas barrier laminate.

The coating liquid (a) is preferably applied on the layer (B) so that these layers will be adjacent to each other. The application methods are not particularly limited. Exemplary methods are casting, dipping, roll coating, gravure coating, screen printing, reverse coating, spray coating, kit coating, die coating, metalling bar coating, chamber doctor blade coating and curtain coating.

After the coating liquid (a) is applied on the layer (B), the solvent of the coating liquid (a) is removed by drying to form the layer (A) on the layer (B). The drying methods are not particularly limited. Exemplary methods are hot air drying, hot roll drying, infrared heating and microwave heating. These methods may be used singly or in combination. The drying temperature is not particularly limited, but is preferably 50 to 160° C. when the water or the water/organic solvent mixed solvent as described hereinabove is used as the solvent. The drying pressure is preferably atmospheric pressure or reduced pressure, and is preferably atmospheric pressure from the viewpoint of simple equipment.

The coating liquid (a) is preferably applied and dried such that the obtainable layer (A) has a weight per unit area in the range of 0.1 to 10 $g/m^2$, more preferably 0.1 to 6 $g/m^2$, and still more preferably 0.1 to 2 $g/m^2$.

The coating liquid (a) is preferably applied and dried such that the thickness of the obtainable layer (A) is in the range of 0.05 to 5 μm, more preferably 0.1 to 3 μm, and still more preferably 0.1 to 1 μm.

The layer (A) contains the ultrafine inorganic compound particles and other components that are contained in the coating liquid (a), for example the polyester resin and the sodium polycarboxylate.

When an anchor coating layer is provided on the surface of the substrate, aging treatment may be performed after the anchor coating agent is applied and dried on the substrate, or after the coating liquid (b) is applied and dried to form the layer (B), or after the coating liquid (a) is applied and dried to form the layer (A). The aging treatment may be generally performed at 30 to 200° C., preferably 30 to 150° C. for 0.5 to 10 days, preferably 1 to 7 days.

The gas barrier laminates are produced as described above.

In the processes (1) for manufacturing the gas barrier laminates, the layer (A) containing the ultrafine inorganic compound particles is formed after the layer (B) is produced. In this manner, gas barrier laminate samples with good appearance can be manufactured.

(Processes (2) for Production of Gas Barrier Laminates)

In the processes (2) for producing the gas barrier laminates, the coating liquid (a) is applied on the substrate and dried to form the layer (A), and the coating liquid (b) is applied on the layer (A) and dried to give the layer (B) thereby producing a laminate having the substrate and the gas barrier layer on the substrate.

The processes (2) for producing the gas barrier laminates include a step (step I) of applying the coating liquid (a) on the substrate and drying the same to form the layer (A), and a subsequent step (step II) of applying the coating liquid (b) and drying the same to give the layer (B).

The processes are described in detail below.

The coating liquid (a) may be applied to the substrate by any methods without limitation. Exemplary methods are casting, dipping, roll coating, gravure coating, screen printing, reverse coating, spray coating, kit coating, die coating, metalling bar coating, chamber doctor blade coating and curtain coating.

After the coating liquid (a) is applied on the substrate, the solvent of the coating liquid (a) is removed by drying to form the layer (A) on the substrate. The drying methods are not particularly limited. Exemplary methods are hot air drying, hot roll drying, infrared heating and microwave heating. These methods may be used singly or in combination. The drying temperature is not particularly limited, but is preferably 50 to 160° C. when the water or the water/organic solvent mixed solvent as described hereinabove is used as the solvent. The drying pressure is preferably atmospheric pressure or reduced pressure, and is preferably atmospheric pressure from the viewpoint of simple equipment.

The layer (A) contains the ultrafine inorganic compound particles. To increase the adhesion between the substrate and the layer (A), the substrate preferably has an anchor coating layer on the surface.

When an anchor coating layer is provided on the surface of the substrate, the anchor coating agent is applied on the substrate and dried. Thereafter, the coating liquid (a) is applied and dried to form the layer (A) on the substrate having the anchor coating layer.

The coating liquid (a) is preferably applied and dried such that the obtainable layer (A) has a weight per unit area in the range of 0.1 to 10 g/m$^2$, more preferably 0.1 to 6 g/m$^2$, and still more preferably 0.1 to 2 g/m$^2$.

The coating liquid (a) is preferably applied and dried such that the thickness of the obtainable layer (A) is in the range of 0.05 to 5 more preferably 0.1 to 3 μm, and still more preferably 0.1 to 1 μm.

After the layer (A) is formed on the substrate, the coating liquid (b) is applied on the layer (A) and dried to give the layer (B), thereby producing a gas barrier laminate.

When the multilayer structure has the layer (A) and the layer (B) adjacent to each other, the coating liquid (b) is applied on the layer (A). The application methods are not particularly limited. Exemplary methods are casting, dipping, roll coating, gravure coating, screen printing, reverse coating, spray coating, kit coating, die coating, metalling bar coating, chamber doctor blade coating and curtain coating.

After the coating liquid (b) is applied on the layer (A), the solvent of the coating liquid (b) is removed by drying to form the layer (B) on the layer (A). The drying methods are not particularly limited. Exemplary methods are hot air drying, hot roll drying, infrared heating and microwave heating. These methods may be used singly or in combination. The drying temperature is not particularly limited, but is preferably 50 to 160° C. when the water or the water/organic solvent mixed solvent as described hereinabove is used as the solvent. The drying pressure is preferably atmospheric pressure or reduced pressure, and is preferably atmospheric pressure from the viewpoint of simple equipment.

When the substrate has an anchor coating layer on its surface to increase the adhesion between the substrate and the layer (A), aging treatment may be performed after the anchor coating agent is applied and dried on the substrate, or after the coating liquid (a) is applied and dried to form the layer (A), or after the coating liquid (b) is applied and dried to form the layer (B). The aging treatment may be generally performed at 30 to 200° C., preferably 30 to 150° C. for 0.5 to 10 days, preferably 1 to 7 days.

When the coating liquid (b) contains at least one silicon-containing compound (i) selected from silane coupling agents, hydrolysates thereof and condensates of these compounds, heat treatment may be performed after the completion (or substantial completion) of the drying or after the completion of the aging treatment, in order to increase the proportion of condensate relative to the silicon-containing compound in the layer (B).

The heat treatment is usually performed at 120 to 240° C., preferably 150 to 230° C. for 10 seconds to 30 minutes, preferably 20 seconds to 20 minutes.

The drying, the aging treatment and the heat treatment have partially similar temperature conditions. These treatments do not need to be clearly separated and may be performed consecutively.

The coating liquid (b) is preferably applied and dried such that the obtainable layer (B) has a weight per unit area in the range of 0.1 to 10 g/m$^2$, more preferably 0.1 to 6 g/m$^2$, and still more preferably 0.1 to 2 g/m$^2$.

The coating liquid (b) is preferably applied and dried such that the thickness of the obtainable layer (B) is in the range of 0.05 to 5 μm, more preferably 0.1 to 3 μm, and still more preferably 0.1 to 1 μm.

The gas barrier laminates are produced as described above.

When the coating liquid (b) in the processes (1) or (2) contains an additive compound having two or more hydroxyl groups such as polyvinyl alcohol, the hydroxyl groups may form ester bonds with part of the carboxyl groups of the polycarboxylic acid polymer.

(Processes (3) for Producing Gas Barrier Laminates)

In the processes (3) for the production of the gas barrier laminates, another substrate is laminated via an adhesive layer on at least one of the substrate and the gas barrier layer of the laminate obtained by the production process (1) or (2).

The additional substrate may be laminated by any methods such as dry lamination processes and extrusion lamination processes without limitation. In the dry lamination process, the adhesive may be applied by any methods without limitation, for example by gravure coating methods.

According to the production processes (3) for the gas barrier laminates, the multilayer structures of the gas barrier laminates, such as substrate/gas barrier layer/adhesive layer/additional substrate and additional substrate/adhesive layer/substrate/gas barrier layer/adhesive layer/additional substrate, add strength, sealing properties, easy seal-opening properties, designs, light-shielding properties, moisture proof properties and oxygen absorption properties. In addition, the additional substrates protect the gas barrier layers from direct contact with hot water or vapor in treatments such as retort treatment and boiling treatment described later, thereby achieving good appearance.

When the gas barrier layers in the gas barrier laminates have a plurality of the layers (A) or the layers (B), these layers (A) or (B) may be formed in the same manner as described above.

The gas barrier laminates according to the invention may be used as packaging materials for foods, beverages, drugs and precision metal parts such as electronic components. In particular, the laminates may be suitably used as packaging materials for foods. When the gas barrier laminates are used as food packaging materials, the laminates having the contents such as food items may be retorted or boiled to sterilize the contents.

The gas barrier laminates maintain excellent transparency after being retorted or boiled, and tend to improve gas barrier properties compared to before the retort treatment or the boiling treatment. Accordingly, the gas barrier laminates of the invention are particularly suited as packaging materials in applications that require heat sterilization after contents such as foods are packed in the laminates.

The gas barrier laminates that have been retorted or boiled have an oxygen permeability measured on a sample area of 50 cm$^2$ at 20° C. and 80% relative humidity (RH) on both sides in accordance with B method (equal pressure method) in JIS K-7126 and a method described in ASTM D 3985, of not more than 100 cm$^3$/m$^2$·day·MPa, preferably not more than 50 cm$^3$/m$^2$·day·MPa, more preferably not more than 20 cm$^3$/m$^2$·day·MPa, and particularly preferably not more than 10 cm$^3$/m$^2$·day·MPa. Lower oxygen permeability is more preferable. The lower limit thereof is not particularly limited, but is usually 0.1 cm$^3$/m$^2$·day·MPa or above.

The conditions of the retort treatment and the boiling treatment will be described below. The conditions may be appropriately modified depending on the contents.

The retort treatment is pressure sterilization of microorganisms such as fungi, yeast and bacteria for the preservation of food or the like. In general, the gas barrier laminates containing food are pressurized and sterilized at 105 to 140° C. and 0.15 to 0.3 MPa for 10 to 120 minutes. Steam retort apparatuses use hot vapor, and hot water retort apparatuses utilize pressurized hot water. These apparatuses are appropriately selected in accordance with sterilization conditions for contents such as food.

The boiling treatment is sterilization by moist heat for the preservation of food or the like. The boiling conditions vary depending on the contents. In a usual case, the gas barrier laminates having contents such as food are sterilized at 60 to 100° C. and atmospheric pressure for 10 to 120 minutes. The boiling treatment is usually carried out with a hot water bath. In a batch system, the gas barrier laminates are soaked in a hot water bath at the predetermined temperature and are collected after the prescribed time. In a continuous sterilization system, the gas barrier laminates are passed through a tunnel of hot water bath.

EXAMPLES

The present invention will be described in detail by presenting examples hereinbelow without limiting the scope of the invention.

Example 1

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA (isopropyl alcohol) was added, and the mixture was stirred to give a coating liquid (a-1) (solid concentration 10 wt %).

Example 2

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 9.0 g were added to 61.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 57.1 g of distilled water, 2.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-2) (solid concentration 10 wt %).

Example 3

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (DURANATE WB40-100 manufactured by Asahi Kasei Chemicals Corporation, solid concentration 100 wt %), followed by stirring. Thereafter, 10.3 g of IPA was added, and the mixture was stirred to give a coating liquid (a-3) (solid concentration 10 wt %).

Example 4

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 54.1 g of distilled water and 5.6 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g), followed by stirring. Thereafter, 10.3 g of IPA was added, and the mixture was stirred to give a coating liquid (a-4) (solid concentration 10 wt %).

Example 5

Ultrafine zinc oxide particles (FINEX 50 manufactured by SAKAI CHEMICAL INDUSTRY CO., LTD., average primary particle diameter 20 nm) weighing 26.0 g and sodium polyacrylate (ARON T-50 manufactured by TOAGOSEI CO., LTD., solid concentration 40 wt %) as a dispersant weighing 2.6 g were added to 71.4 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 51.64 g of distilled water, 7.56 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-5) (solid concentration 10 wt %).

Example 6

Ultrafine zinc oxide particles (FINEX 50 manufactured by SAKAI CHEMICAL INDUSTRY CO., LTD., average primary particle diameter 20 nm) weighing 32.2 g and sodium polyacrylate (ARON T-50 manufactured by TOAGOSEI CO., LTD., solid concentration 40 wt %) as a dispersant weighing 3.2 g were added to 64.6 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 57.1 g of distilled water, 2.15 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %) followed by stirring. Thereafter, 10.3 g of IPA was added, and the mixture was stirred to give a coating liquid (a-6) (solid concentration 10 wt %).

Example 7

Ultrafine zinc oxide particles (FINEX 50 manufactured by SAKAI CHEMICAL INDUSTRY CO., LTD., average primary particle diameter 20 nm) weighing 30.0 g and sodium polyacrylate (AQUALIC DL40S manufactured by NIPPON SHOKUBAI CO., LTD., solid concentration 44 wt %) as a dispersant weighing 2.7 g were added to 67.3 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-7) (solid concentration 10 wt %).

Example 8

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (ARON A-6330 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-8) (solid concentration 10 wt %).

Example 9

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (POIZ 520 manufactured by Kao Corporation, solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-9) (solid concentration 10 wt %).

Example 10

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 55.6 g of distilled water, 3.62 g of an aqueous polyester resin dispersion (Vylonal MD-1200 manufactured by TOYOBO Co., LTD., solid concentration 34 wt %, polyester resin having a number average molecular weight of 15,000, Tg of 67° C. and an acid value of less than 3 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-10) (solid concentration 10 wt %).

Example 11

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 54.3 g of distilled water, 4.9 g of an aqueous polyester resin dispersion (PESRESIN A124GP manufactured by TAKAMATSU OIL & FAT CO., LTD., solid concentration 25 wt %, polyester resin having a number average molecular weight of 15,000, Tg of 55° C. and an acid value of less than 2 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-11) (solid concentration 10 wt %).

Example 12

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 3.0 g were added to 67.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 65.4 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thus, a coating liquid (a-12) (solid concentration 10 wt %) was obtained.

Comparative Example 1

Ultrafine zinc oxide particles (FINEX 50 manufactured by SAKAI CHEMICAL INDUSTRY CO., LTD., average primary particle diameter 20 nm) weighing 30.0 g were added to 70.0 g of distilled water. The mixture was stirred sufficiently with a high-speed stirrer (T.K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 54.35 g of distilled water, 5.2 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-13) (solid concentration 10 wt %).

Comparative Example 2

Ultrafine zinc oxide particles (FINEX 50 manufactured by SAKAI CHEMICAL INDUSTRY CO., LTD., average primary particle diameter 20 nm) weighing 30.0 g and sodium polyacrylate (ARON T-50 manufactured by TOAGOSEI CO., LTD., solid concentration 40 wt %) as a dispersant weighing 9.0 g were added to 61.0 g of distilled water. The mixture was stirred sufficiently with a high-speed stirrer (T. K. FILMIX manufactured by PRIMIX Corporation) to give 100.0 g of an aqueous ultrafine zinc oxide particle dispersion. To 25.0 g of the aqueous ultrafine zinc oxide particle dispersion, there were added 53.6 g of distilled water and 0.45 g of a water-dispersible isocyanate compound (Liofol Hardener UR5889-21 manufactured by Henkel, solid concentration 100 wt %), followed by stirring. Thereafter, 9.6 g of IPA was added, and the mixture was stirred to give a coating liquid (a-14) (solid concentration 10 wt %).

Preparation Example b-1

80 g of polyacrylic acid having a number average molecular weight of 200,000 (ARON A-10H manufactured by TOAGOSEI CO., LTD., a 25 wt % aqueous solution) was dissolved in 117.7 g of distilled water. Zinc oxide (manufactured by Wako Pure Chemical Industries, Ltd.) weighing 2.3 g was added to neutralize 20 mol % of the carboxyl groups of the polyacrylic acid. Thereafter, distilled water was added to obtain a solid concentration of 10 wt %. Thus, a coating liquid (b-1) was prepared.

Preparation Example b-2

6.84 g of tetramethoxysilane (TMOS manufactured by ALDRICH) was dissolved in 8.2 g of methanol, and 1.36 g of γ-glycidoxypropyltrimethoxysilane (GPTMS, manufactured by Shin-Etsu Chemical Co., Ltd.) was dissolved in the solution. To the resultant solution, 0.51 g of distilled water and 1.27 g of 0.1 N hydrochloric acid were added to give a sol. While stirring the sol, hydrolysis and condensation were performed at 10° C. for 1 hour, resulting in a solution containing a hydrolyzed condensate. The solution containing a hydrolyzed condensate was diluted with 18.5 g of distilled water. The diluted solution was then added to 63.4 g of the coating liquid (b-1) with stirring. Thus, a coating liquid (b-2) was prepared.

Example 13

A polyester main agent (TAKELAC A525 manufactured by Mitsui Chemicals Polyurethanes Inc., solid concentration 50 wt %) and a curing agent (TAKENATE A52 manufactured by Mitsui Chemicals Polyurethanes Inc., solid concentration 75 wt %) in a weight ratio (main agent/curing agent) of 9/1 were dissolved in a solvent (ethyl acetate) to give an anchor coating liquid with a solid concentration of 5 wt %. The anchor coating liquid was applied to a polyester film (LUMIRROR P60 manufactured by TORAY INDUSTRIES INC., thickness 12 μm) with the use of a bar coater (K303 Bar manufactured by RK Print-Coat Instruments Ltd.) such that the dry weight per unit area would be 0.20 g/m² and the dry thickness would be 0.2 μm. The coating liquid was dried with a dryer. On the anchor coating layer formed, the coating liquid (b-1) was applied with the bar coater and dried such that the dry weight per unit area would be 0.40 g/m² and the dry thickness would be 0.3 μm.

On the layer formed from the coating liquid (b-1), the coating liquid (a-1) was applied with the bar coater and dried such that the dry weight per unit area would be 0.45 g/m² and the dry thickness would be 0.3 μm.

In the above manner, a gas barrier laminate was obtained in which the anchor coating layer, the layer from the coating liquid (b-1) (the polyacrylic acid layer) and the layer from the coating liquid (a-1) (the layer (A) containing ultrafine zinc oxide particles) were laminated on the polyester film in this order.

Example 14

A gas barrier laminate was obtained in the same manner as in Example 13, except that the coating liquid (b-1) was replaced by the coating liquid (b-2).

Example 15

A gas barrier laminate was obtained in the same manner as in Example 13, except that the coating liquid (b-1) was replaced by the coating liquid (b-2) and that the coating liquid (a-1) was replaced by the coating liquid (a-2).

Example 16

A gas barrier laminate was obtained in the same manner as in Example 13, except that the coating liquid (b-1) was replaced by the coating liquid (b-2) and that the coating liquid (a-1) was replaced by the coating liquid (a-3).

Example 17

A gas barrier laminate was obtained in the same manner as in Example 13, except that the coating liquid (b-1) was replaced by the coating liquid (b-2) and that the coating liquid (a-1) was replaced by the coating liquid (a-4).

Example 18

A gas barrier laminate was obtained in the same manner as in Example 13, except that the coating liquid (b-1) was replaced by the coating liquid (b-2), that the coating liquid (a-1) was replaced by the coating liquid (a-5), and that the coating liquid (a-5) was applied on the layer from the coating liquid (b-2) and dried such that the dry weight per unit area would be 0.44 g/m² and the dry thickness would be 0.3 μm.

Example 19

A gas barrier laminate was obtained in the same manner as in Example 13, except that the coating liquid (b-1) was replaced by the coating liquid (b-2), that the coating liquid (a-1) was replaced by the coating liquid (a-6), and that the coating liquid (a-6) was applied on the layer from the coating liquid (b-2) and dried such that the dry weight per unit area would be 0.47 g/m² and the dry thickness would be 0.3 μm.

Example 20

A gas barrier laminate was obtained in the same manner as in Example 13, except that the coating liquid (b-1) was replaced by the coating liquid (b-2) and that the coating liquid (a-1) was replaced by the coating liquid (a-7).

Example 21

A gas barrier laminate was obtained in the same manner as in Example 13, except that the coating liquid (b-1) was replaced by the coating liquid (b-2) and that the coating liquid (a-1) was replaced by the coating liquid (a-8).

Example 22

A gas barrier laminate was obtained in the same manner as in Example 13, except that the coating liquid (b-1) was replaced by the coating liquid (b-2) and that the coating liquid (a-1) was replaced by the coating liquid (a-9).

Example 23

A gas barrier laminate was obtained in the same manner as in Example 13, except that the coating liquid (b-1) was replaced by the coating liquid (b-2) and that the coating liquid (a-1) was replaced by the coating liquid (a-10).

Example 24

A gas barrier laminate was obtained in the same manner as in Example 13, except that the coating liquid (b-1) was replaced by the coating liquid (b-2) and that the coating liquid (a-1) was replaced by the coating liquid (a-11).

Example 25

A gas barrier laminate was obtained in the same manner as in Example 13, except that the coating liquid (b-1) was replaced by the coating liquid (b-2) and that the coating liquid (a-1) was replaced by the coating liquid (a-12).

Comparative Example 3

A gas barrier laminate was obtained in the same manner as in Example 13, except that the coating liquid (b-1) was replaced by the coating liquid (b-2) and that the coating liquid (a-1) was replaced by the coating liquid (a-13).

Comparative Example 4

A gas barrier laminate was obtained in the same manner as in Example 13, except that the coating liquid (b-1) was replaced by the coating liquid (b-2), that the coating liquid (a-1) was replaced by the coating liquid (a-14), and that the coating liquid (a-14) was applied on the layer from the coating liquid (b-2) and dried such that the dry weight per unit area would be 0.47 g/m$^2$ and the dry thickness would be 0.3

Example 26

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (ARON A-6330 manufactured by TOAGOSEI CO., LTD., solid concentration 40 wt %) as a dispersant weighing 3.0 g were added to 67.0 g of distilled water. The mixture was stirred sufficiently with a stirrer. A 30.0 g portion thereof was sufficiently dispersed using a planetary ball mill (P-7 manufactured by Fritsch Japan Co., Ltd.) containing 0.3 mm diameter zirconia beads. The zirconia beads were separated by sieving, thereby obtaining an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-15) (solid concentration 10 wt %).

Example 27

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (POIZ 520 manufactured by Kao Corporation, solid concentration 40 wt %) as a dispersant weighing 3.0 g were added to 67.0 g of distilled water. The mixture was stirred sufficiently with a stirrer. A 30.0 g portion thereof was sufficiently dispersed using a planetary ball mill (P-7 manufactured by Fritsch Japan Co., Ltd.) containing 0.3 mm diameter zirconia beads. The zirconia beads were separated by sieving, thereby obtaining an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-8803 manufactured by UNITIKA LTD., solid concentration 30 wt %, polyester resin having a number average molecular weight of 13,000, Tg of 65° C. and an acid value of 7 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-16) (solid concentration 10 wt %).

Example 28

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (POIZ 521 manufactured by Kao Corporation, solid concentration 40 wt %) as a dispersant weighing 3.0 g were added to 67.0 g of distilled water. The mixture was stirred sufficiently with a stirrer. A 30.0 g portion thereof was sufficiently dispersed using a planetary ball mill (P-7 manufactured by Fritsch Japan Co., Ltd.) containing 0.3 mm diameter zirconia beads. The zirconia beads were separated by sieving, thereby obtaining an aqueous ultrafine zinc oxide particle dispersion. To 25.0 g of the aqueous ultrafine zinc oxide particle dispersion, there were added 54.3 g of distilled water, 4.9 g of an aqueous polyester resin dispersion (Elitel KT-0507 manufactured by UNITIKA LTD., solid concentration 25 wt %, polyester resin having a number average molecular weight of 17,000, Tg of −25° C. and an acid value of 11 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-17) (solid concentration 10 wt %).

Example 29

Ultrafine zinc oxide particles (FINEX 50 manufactured by SAKAI CHEMICAL INDUSTRY CO., LTD., average primary particle diameter 20 nm) weighing 30.0 g and sodium acrylate maleate copolymer (ARON A-6330 manufactured by TOAGOSEI CO., LTD., solid concentration 40 wt %) as a dispersant weighing 3.0 g were added to 67.0 g of distilled water. The mixture was stirred sufficiently with a stirrer. A 30.0 g portion thereof was sufficiently dispersed using a planetary ball mill (P-7 manufactured by Fritsch Japan Co., Ltd.) containing 0.3 mm diameter zirconia beads. The zirconia beads were separated by sieving, thereby obtaining an aqueous ultrafine zinc oxide particle dispersion. To 25.0 g of the aqueous ultrafine zinc oxide particle dispersion, there were added 54.3 g of distilled water, 4.9 g of an aqueous polyester resin dispersion (Elitel KT-0507 manufactured by UNITIKA LTD., solid concentration 25 wt %, polyester resin having a number average molecular weight of 17,000, Tg of −25° C. and an acid value of 11 mg KOH/g) and 0.45 g of a water-dispersible isocyanate compound (Liofol Hardener UR5889-21 manufactured by Henkel, solid concentration 100 wt %), followed by stirring. Thereafter, 10.3 g of IPA was added, and the mixture was stirred to give a coating liquid (a-18) (solid concentration 10 wt %).

Example 30

Ultrafine zinc oxide particles (FINEX manufactured by SAKAI CHEMICAL INDUSTRY CO., LTD., average particle diameter 20 nm) weighing 30.0 g and sodium acrylate maleate copolymer (POIZ 521 manufactured by Kao Corporation, solid concentration 40 wt %) as a dispersant weighing 3.0 g were added to 67.0 g of distilled water. The mixture was stirred sufficiently with a stirrer. A 30.0 g portion thereof was sufficiently dispersed using a planetary ball mill (P-7 manufactured by Fritsch Japan Co., Ltd.) containing 0.3 mm diameter zirconia beads. The zirconia beads were separated by sieving, thereby obtaining an aqueous ultrafine zinc oxide particle dispersion. To 25.0 g of the aqueous ultrafine zinc oxide particle dispersion, there were added 55.1 g of distilled water, 4.1 g of an aqueous polyester resin dispersion (Elitel KT-9204 manufactured by UNITIKA LTD., solid concentration 30 wt %, polyester resin having a number average molecular weight of 17,000, Tg of 18° C. and an acid value of 7 mg KOH/g) and 0.45 g of a water-dispersible isocyanate compound (Liofol Hardener UR5889-21 manufactured by Henkel, solid concentration 100 wt %), followed by stirring.

Thereafter, 10.3 g of IPA was added, and the mixture was stirred to give a coating liquid (a-19) (solid concentration 10 wt %).

Example 31

A gas barrier laminate was obtained in the same manner as in Example 13, except that the coating liquid (b-1) was replaced by the coating liquid (b-2) and that the coating liquid (a-1) was replaced by the coating liquid (a-15).

Example 32

A gas barrier laminate was obtained in the same manner as in Example 13, except that the coating liquid (b-1) was replaced by the coating liquid (b-2) and that the coating liquid (a-1) was replaced by the coating liquid (a-16).

Example 33

A gas barrier laminate was obtained in the same manner as in Example 13, except that the coating liquid (b-1) was replaced by the coating liquid (b-2) and that the coating liquid (a-1) was replaced by the coating liquid (a-17).

Example 34

A gas barrier laminate was obtained in the same manner as in Example 13, except that the coating liquid (b-1) was replaced by the coating liquid (b-2) and that the coating liquid (a-1) was replaced by the coating liquid (a-18).

Example 35

A gas barrier laminate was obtained in the same manner as in Example 13, except that the coating liquid (b-1) was replaced by the coating liquid (b-2) and that the coating liquid (a-1) was replaced by the coating liquid (a-19).

[Evaluation Methods]

The gas barrier laminates obtained in Examples and Comparative Examples were tested to evaluate (i) haze, (ii) oxygen permeability and (iii) peel strength by the following methods. The results are shown in Tables 1 and 2.

(i) Haze of Gas Barrier Laminates

The gas barrier laminates obtained in Examples and Comparative Examples were tested in accordance with JIS K-7136 using a haze meter (Haze Meter NDH2000 manufactured by NIPPON DENSHOKU INDUSTRIES CO., LTD.) to determine the haze.

(ii) Oxygen Permeability

On the layer (A) containing ultrafine zinc oxide particles of the gas barrier laminates obtained in Examples and Comparative Examples, a biaxially stretched nylon film (ONUM manufactured by UNITIKA LTD., thickness: 15 μm) and an unstretched polypropylene film (ZK93-FM manufactured by TORAY ADVANCED FILM CO., LTD., thickness: 60 μm) were sequentially dry laminated through a polyurethane adhesive (main agent: TAKELAC A620 manufactured by Mitsui Chemicals Polyurethanes Inc., curing agent: TAKENATE A65 manufactured by Mitsui Chemicals Polyurethanes Inc., main agent/curing agent weight ratio=16/1). The resultant multilayer film was retort treated in a retort treatment device (RCS-60 manufactured by HISAKA WORKS, LTD.) at 120° C. for 40 minutes.

The retort-treated multilayer film was tested by a B method (equal pressure method) in accordance with JIS K-7126 and a method described in ASTM D 3985, using an oxygen permeability tester (OX-TRAN™ 2/20 manufactured by Modern Control, Inc.) on a sample area of 50 cm$^2$ at 20° C. and 80% relative humidity (RH) on both sides, thereby determining the oxygen permeability of the multilayer film.

(iii) Peel Strength

A multilayer film was retort-treated in the same manner as in the evaluation of oxygen permeability (ii). Immediately after the retort treatment, the peel strength was measured using a tensile tester (TENSILON RC-1210A manufactured by ORIENTEC Co., LTD.). In detail, the peel strength of a 15 mm wide test piece was measured by a T-shape peeling test at a rate of 200 mm/min in accordance with JIS K-6854-3.

TABLE 1

| | Haze of gas barrier laminate [%] | Oxygen permeability of multilayer film [cm$^3$/m$^2$ · day · MPa] | Peel strength of multilayer film [N/15 mm] |
|---|---|---|---|
| Example 13 | 3.5 | 1.0 | 4.0 |
| Example 14 | 3.2 | 1.0 | 4.2 |
| Example 15 | 3.4 | 1.5 | 3.8 |
| Example 16 | 3.4 | 2.0 | 3.5 |
| Example 17 | 3.2 | 1.5 | 3.2 |
| Example 18 | 3.3 | 5.0 | 4.2 |
| Example 19 | 3.5 | 1.0 | 3.8 |
| Example 20 | 3.2 | 1.0 | 4.2 |
| Example 21 | 3.2 | 1.0 | 4.2 |
| Example 22 | 3.2 | 1.0 | 4.2 |
| Example 23 | 3.5 | 2.0 | 3.5 |
| Example 24 | 3.5 | 2.0 | 3.5 |
| Example 25 | 3.8 | 2.0 | 4.0 |
| Comparative Example 3 | 55.0 | 300.0 | 2.0 |
| Comparative Example 4 | 60.0 | 500.0 | 1.0 |

TABLE 2

| | Haze of gas barrier laminate [%] | Oxygen permeability of multilayer film [cm$^3$/m$^2$ · day · MPa] | Peel strength of multilayer film [N/15 mm] |
|---|---|---|---|
| Example 31 | 3.0 | 1.0 | 4.2 |
| Example 32 | 3.0 | 1.0 | 4.2 |
| Example 33 | 3.8 | 1.0 | 4.5 |
| Example 34 | 3.8 | 1.5 | 4.2 |
| Example 35 | 3.4 | 1.0 | 4.2 |

INDUSTRIAL APPLICABILITY

The coating liquids (a) of the invention are aqueous coating liquids that contain ultrafine inorganic compound particles with good dispersibility. The gas barrier laminates of the invention have the layer formed from the coating liquid and show excellent transparency and gas barrier properties. The gas barrier laminates may be used as packaging materials for foods, beverages, chemicals, drugs and precision metal parts such as electronic components. In particular, the laminates may be suitably used as packaging materials for foods.

The invention claimed is:

1. A gas barrier laminate comprising a substrate and a gas barrier layer formed on the substrate, wherein
the gas barrier layer comprises a layer (A) formed from a coating liquid and a layer (B) containing a polycarboxylic acid polymer,
wherein the coating liquid comprises ultrafine inorganic compound particles, a polyester resin, a sodium polycarboxylate and water, wherein the ultrafine inorganic compound particles have a particle diameter ranging from 1 nm to 200 nm.

2. The gas barrier laminate according to claim 1, wherein the layer (A) and the layer (B) in the gas barrier layer are adjacent to each other.

3. The gas barrier laminate according to claim 1, wherein the layer (A) has a weight per unit area that is at least ⅓ times the weight per unit area of the layer (B).

4. The gas barrier laminate according to claim 1, wherein the layer (A) contains the ultrafine inorganic compound particles at 65 to 90 wt % based on 100 wt % of the layer (A).

5. The gas barrier laminate according to claim 1, wherein the gas barrier laminate comprises another substrate that is laminated on at least one of the substrate and the gas barrier layer via an adhesive layer.

* * * * *